United States Patent [19]

Provost

[11] Patent Number: 4,670,960

[45] Date of Patent: Jun. 9, 1987

[54] STRIP FASTENER MATERIAL

[75] Inventor: George A. Provost, Litchfield, N.H.

[73] Assignee: Actief N.V., ABN Trust Company (Curacao) N.V., Willemstad, Netherlands Antilles

[21] Appl. No.: 933,767

[22] Filed: Nov. 20, 1986

Related U.S. Application Data

[62] Division of Ser. No. 865,057, May 20, 1986.

[51] Int. Cl.[4] ........................ B23P 17/00; A44B 18/00

[52] U.S. Cl. ........................................ 29/415; 24/442; 24/449

[58] Field of Search ................................ 29/418, 415; 24/442–450, 580, 588, DIG. 11; 2/DIG. 6; 248/205.2

[56] References Cited

U.S. PATENT DOCUMENTS

| | | | |
|---|---|---|---|
| 1,741,423 | 12/1929 | Lachman | 29/415 |
| 1,890,471 | 12/1932 | Rutherford | 29/415 |
| 2,299,936 | 10/1942 | Smith et al. | 29/415 |
| 2,370,036 | 2/1945 | Howell | 29/415 |
| 2,954,074 | 9/1960 | Meyerhardt | 29/415 |
| 3,962,900 | 6/1976 | Leiblich | 29/415 |

*Primary Examiner*—Howard N. Goldberg
*Assistant Examiner*—Steven Nichols
*Attorney, Agent, or Firm*—Hayes, Davis & Soloway

[57] ABSTRACT

Strip fastener material comprising a first flexible strip of material having a surface of loose-weave fiber wool, the first strip of material being configured as a narrow strip having a plurality of identical, spaced first projections extending sidewards in one direction therefrom; and, a second flexible strip of material having a surface of resiliently flexible hooks adapted to releasably mate with the wool, the second strip of material being configured as a narrow strip having a plurality of identical, spaced second projections extending sidewards in one direction therefrom, the first projections and the second projections being identical in shape.

The material is made by cutting a serpentine path longitudinally through the strips of material to form, in each case, two new strips of material configured as a narrow strip having a plurality of identical spaced projections extending sidewards in one direction therefrom.

The fastening material is easily attached to fabric, or the like, by running parallel lines of stitches through the strips and the fabric where one of the lines of stitches is disposed along lines passing through the narrow strips along one side of the strips and the other of the lines of stitches is disposed along lines passing through the tips of the projections.

10 Claims, 13 Drawing Figures

STRIP FASTENER MATERIAL

This is a divisional of co-pending application Ser. No. 865,057 filed on May 20, 1986.

BACKGROUND OF THE INVENTION

The present invention relates to strip fastener material for releasably fastening two pieces of fabric, or the like, together and, more particularly to strip fastener material comprising a first flexible strip of material having a surface of loose-weave fibers thereon, the first strip of material being configured as a narrow strip having a plurality of identical, spaced first projections extending sidewards in one direction therefrom; and a second flexible strip of material having a surface of resiliently flexible hooks thereon adapted to releasably mate with the loose-weave fibers, the second strip of material being configured as a narrow strip having a plurality of identical, spaced second projections extending in one direction therefrom, the first projections and the second projections being identical in shape, the spaces between the first projections being of identical shape to the first projections, and the spaces between the second projections being of identical shape to the second projections.

Strip fastening material of the kind sold under the trademark VELCRO is extremely well known in the art. In general, the fastener materials come as strips, as shown in FIGS. 1 and 2, or as "discreet patches", as shown in FIGS. 3 and 4. While shown as circles, the patches could as easily be square, triangular, or irregular in shape. In essence, in garments the strip fasteners are used to replace zippers while the patches fasteners are used in lieu of snaps, hooks and eyes, and buttons. Such strip fastening material comprises two components, a first flexible piece of material 10 having a surface of loose-weave fibers (i.e. a "wool" of nylon, or the like) and a second flexible piece of material 12 having a surface of resiliently flexible hooks adapted to releasably mate with the loose-weave fibers of the material 10. Where two pieces of fabric, or the like, are to be releasably joined, one of the fastener pieces 10 or 12 is attached to one of the pieces of fabric and the other fastener piece 12 or 10 is attached to the other piece of fabric. The strips 10, 12 are attached to the fabric by a row of stitches 14 along the edges. The fabric is then joined by pressing the two fastener pieces together and released by ripping them apart. The patches, when used, are typically tack stitched at several points about their periphery or are adhesively attached.

The problem addressed by the present invention is depicted in FIGS. 5 and 6. Each figure represents the sides 15 and 17 of a fabric coat front opening being joined by prior art Velcro brand fastening material comprising the materials 10 and 12 described above. FIG. 5 depicts the use of strip material such as shown in FIGS. 1 and 2 while FIG. 6 depicts the use of patch material such as shown in FIGS. 3 and 4. When providing a strip fastening system on a long expanse such as a coat opening, both the strip and patch systems have drawbacks. While the strips are easily attached and aligned, they are stiffer and may be noisy when bent. Additionally, they use a maximum amount of materials. While patches employ a minimum of material and, because they only attached at spaced locations, are flexible and non-noisy, they are more labor intensive when it comes to attaching them; that is, each patch must be carefully aligned with its mating portion and each patch must be individually attached. If not well adhered or tacked (or completely stitched about the periphery, which is very labor intensive), they can pull off when separation is attempted.

Wherefore, it is the object of the present invention to provide a strip fastener material adapted for use at extended length openings which is flexible, non-noisy, economical with respect to the consumption of materials, well and easily attached, and of low labor intensity with respect to installation.

SUMMARY

The present invention relates to strip fastener material for releasably fastening two pieces of fabric, or the like, together and, more particularly to strip fastener material comprising a first flexible strip of material having a surface of loose-weave fibers, the first strip of material being configured as a narrow strip having a plurality of identical, spaced first projections extending sidewards in one direction therefrom; and a second flexible strip of material having a surface of resiliently flexible hooks adapted to releasably mate with the loose-weave fibers, the second strip of material being configured as a narrow strip having a plurality of identical, spaced second projections extending sidewards in one direction therefrom, the first projections and the second projections being identical in shape. Because of the unique manner of fastening the strips, the spaces between the first projections are of identical shape to the first projections and the spaces between the second projections are of identical shape to the second projections.

The above-described material is made by forming a first flexible strip of material having a surface of loose-weave fibers (i.e. a wool); forming a second flexible strip of material having a surface of resiliently flexible hooks adapted to releasably mate with the loose-weave fiber wool; cutting a serpentine path longitudinally through the first flexible strip of material to form two third strips of material having a surface of loose-weave fiber wool and configured as a narrow strip having a plurality of identical spaced first projections extending sidewards in one direction therefrom; cutting a serpentine path longitudinally through the second flexible strip of material to form two fourth strips of material having a surface of resiliently flexible hooks adapted to releasably mate with the loose-weave fiber wool and configured as a narrow strip having a plurality of identical spaced second projections extending sidewards in one direction therefrom, the first projections and second projections being identical in shape; and, using one of the third strips and one of the fourth strips in combination as the fastening material.

The fastening material of the present invention is easily attached to fabric, or the like, by running parallel lines of stitches through the third and fourth strips and the fabric where one of the lines of stitches is disposed along lines passing through the narrow strips along one side of the third and fourth strips and the other of the lines of stitches is disposed along lines passing through the tips of the first and second projections.

DESCRIPTION OF THE PREFERRED EMBODIMENT

Figure 1:
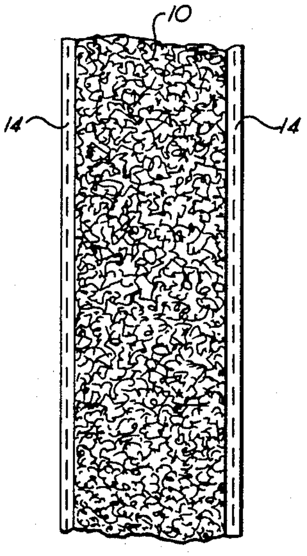
FIG. 1 Prior Art
FIG. 1 is a plan view of a portion of a strip of the wool surfaced portion of prior art fastening material.
Figure 2:
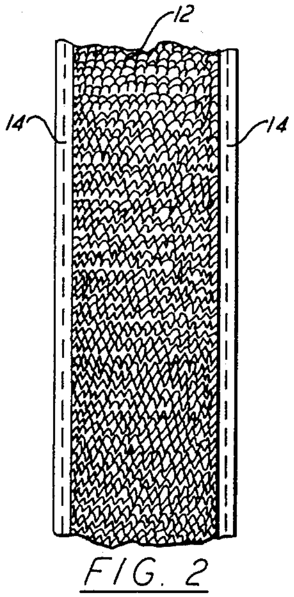
FIG. 2 Prior Art
FIG. 2 is a plan view of a portion of a strip of the hook surfaced portion of prior art fastening material for mating with the portion of FIG. 1.
Figure 3:
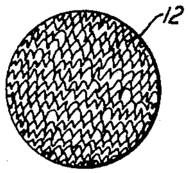
FIG. 3 Prior Art
FIG. 3 is a plan view of a patch of the hook surfaced portion of prior art fastening material.
Figure 4:
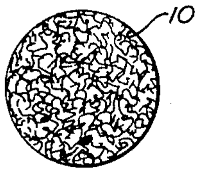
FIG. 4 Prior Art
FIG. 4 is a plan view of a patch of the wool surfaced portion of prior art fastening material for mating with the portion of FIG. 3.
Figure 5:
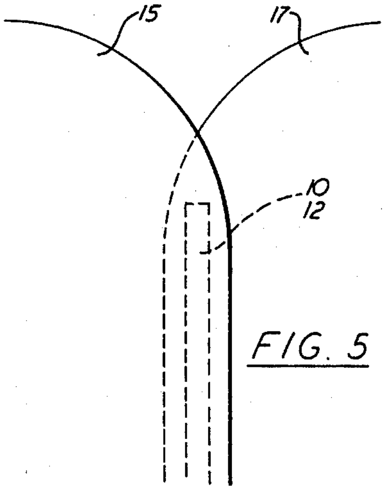
FIG. 5 is a simplified drawing of the front opening of a coat, or the like, showing the use of the prior art fastening material of FIGS. 1 and 2.
Figure 6:
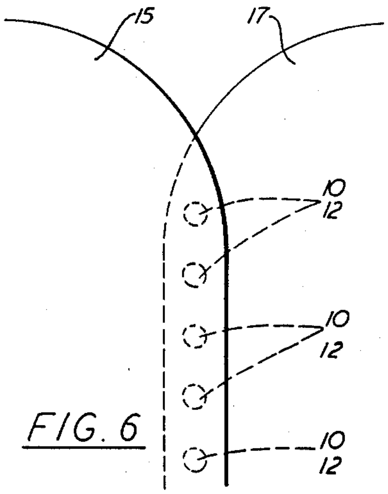
FIG. 6 is a simplified drawing of the front opening of a coat, or the like, showing the use of the prior art fastening material of FIGS. 3 and 4.
Figure 7:
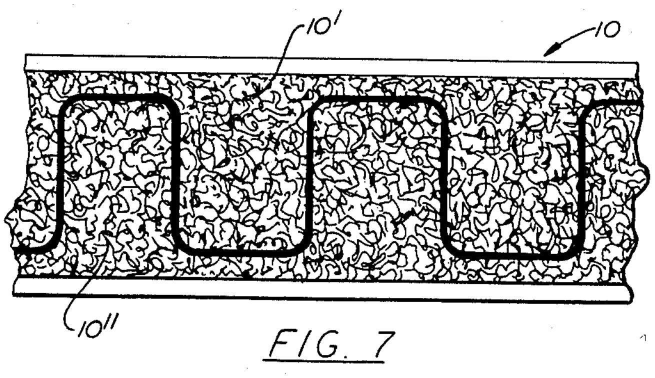
FIG. 7 is a drawing showing how the strip material of FIG. 1 is cut to achieve the benefits of the present invention.
Figure 8:
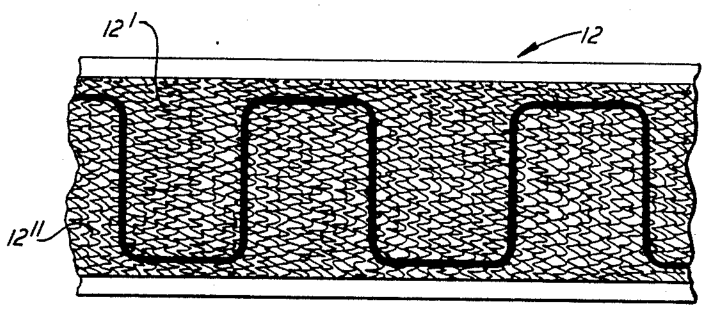
FIG. 8 is a drawing showing how the strip material of FIG. 2 is cut to achieve the benefits of the present invention.
Figure 9:
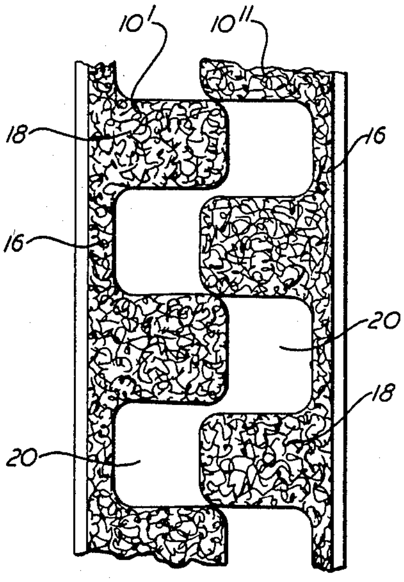
FIG. 9 is a drawing showing how the cut strip material of FIG. 8 is separated to provide double the amount of usable material.

The present invention is founded on method and apparatus for dividing the strips 10 and 12 of FIGS. 1 and 2 to produce twice as much usable fastening material having improved characteristics. The basic premise is shown in FIGS. 7 and 8 which show the strips 10 and 12 cut longitudinally along a serpentine path (which is bisected by the center line of the strip) to produce a pair of strips 10' and 10" and a pair of strips 12' and 12". As shown in FIG. 9 by way of example, after cutting, the strips 10' and 10" can be separated; and, once separated, comprise individually usable strips having a narrow strip of material 16 along one side having a plurality of identical, spaced projections 18 extending sidewards therefrom. Note that the projections 18 are identical in size and shape to the spaces 20 between them. This is, of course, because of the specific shape chosen for the serpentine cut.

Figure 10:
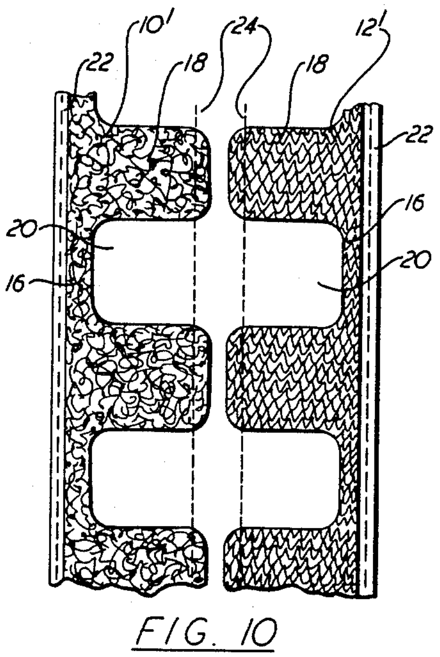
FIG. 10 is a drawing showing the alignment in use of one of the two separated pieces from FIG. 7 and one of the two separated pieces from FIG. 8 to produce the fastening system of the present invention.

As shown in FIG. 10, in use, one of the strips 10', 10" and one of the strips 12', 12" are combined and attached to the fabric (not shown) by parallel rows of stitches where one row of stitches 22, in each case, is along a line passing through the narrow strip of material 16 and the other row of stitches 24, in each case, is along a line passing through the tips of the projections 18. Note also that the projections 18 of both strips 10' and 12' are placed in aligned juxtaposition so that they will mate during closing of the fastener. The narrow strip of material 16 makes alignment of the fastening material and the mating projections 18 easy and automatic. The stitches 22, 24 are easily accomplished by a double needled sewing machine and provide an attachment to the fabric which is highly resistive to separation during use.

Figure 11:
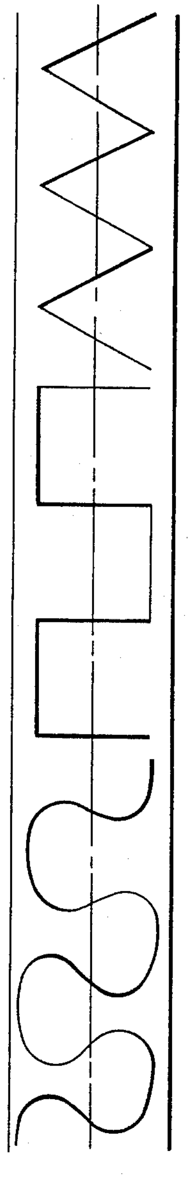
FIG. 11 is a drawing showing several alternate cut patterns for the serpentine path possible with the present invention.

While a generally rounded corner serpentine path for the cut has been shown and is preferred, as shown in FIG. 11, many "serpentine" paths could be used for the longitudinal cut to accomplish the objectives of the present invention. Thus, triangular, square, and completely rounded paths would be possible as well as others not shown. All that is required is that the resultant projections 18 and the spaces 20 produced between them be substantially identical. This criteria produces two identical strips thus doubling the useful length of fastener produced from each original rectangular strip. In fact, employing some of the various interlocking patterns developed for floor tiles could produce projections and spaces of a highly decorative nature in addition to their functional improvement to the strip fastener art.

Figure 12:
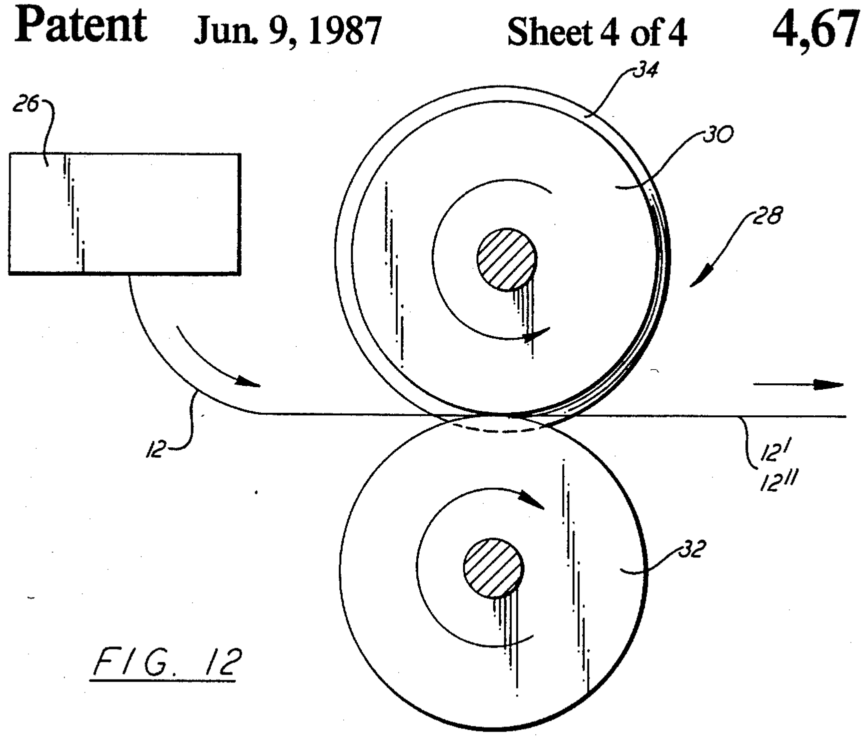
FIG. 12 is a simplified side view of apparatus for producing fastening material according to the present invention.
Figure 13:
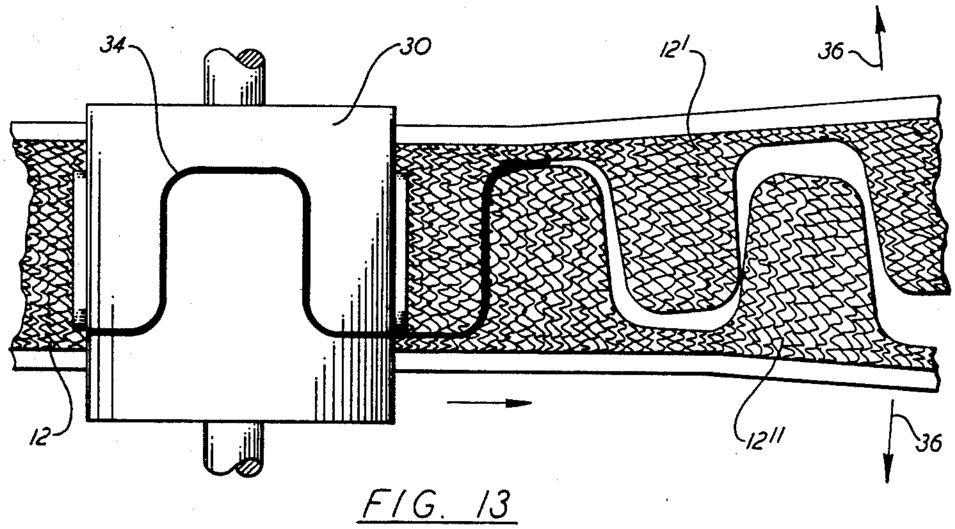
FIG. 13 is a top view of the cookie cutter roller portion of the apparatus of FIG. 12.

The preferred apparatus for producing the present invention as employed by the assignee of this application in commercial production are cutter carrying calandering roll ("cookie cutter") arrangement as shown in FIGS. 12 and 13. The strip material 12, for example, from its usual source 26 is passed between the rollers generally indicated as 28. The cutter roller 30 bears against the support roller 32 with a cutting blade 34 disposed on its outer surface and configured in the shape of the desired serpentine path. Just as a cookie cutter cuts cookie dough to produce desired shapes, the blade 34 on roller 30 cuts the strip 12 longitudinally to form the two strips 12' and 12", which are then separated as indicated by the arrows 36.

Thus, it can be seen that the method and apparatus truly produces a new and novel strip fastener material which achieves all its desired objectives.

Wherefore, having thus described my invention, I claim:

1. The method of forming and using a strip fastener material comprising the steps of:

(a) forming a first flexible strip of material having a surface of loose-weave fiber wool;

(b) forming a second flexible strip of material having a surface of resiliently flexible hooks adapted to releasably mate with the loose-weave fiber wool;

(c) cutting a serpentine path longitudinally through the first flexible strip of material to form two third strips of material having a surface of loose-weave fiber wool and configured as a narrow strip having a plurality of identical spaced first projections extending sidewards therefrom;

(d) cutting a serpentine path longitudinally through the second flexible strip of material to form two fourth strips of material having a surface of resiliently flexible hooks adapted to releasably mate with the loose-weave fiber wool and configured as a narrow strip having a plurality of identical spaced second projections extending sidewards therefrom, the first projections and the second projections being identical in shape; and, (e) using one of the third strips and one of the fourth strips in combination as the fastening material.

2. The method of claim 6 wherein the projections of each strip all extend in one direction and step (e) thereof comprises the steps of:

(a) attaching one of the third strips to a first surface which is to be releasably fastened to a second surface; and, (b) attaching one of the fourth strips to the second surface with the first projections aligned with the second projections.

3. The method of claim 2 wherein the first and second surfaces are surfaces of a fabric material and steps (a) and (b) thereof of attaching the third and fourth strips comprise:

running parallel lines of stitches through the third and fourth strips and the fabric material where one of the lines of stitches is disposed along lines passing through the narrow strips along one side of the third and fourth strips and the other of the lines of stitches is disposed along lines passing through the tips of the first and second projections.

4. The method of claim 1 wherein:

steps (c) and (d) of cutting serpentine paths comprise cutting along triangular lines which, in each case, are bisected by the center line of the strip being cut.

5. The method of claim 1 wherein:

steps (c) and (d) of cutting serpentine paths comprise cutting along square lines which, in each case, are bisected by the center line of the strip being cut.

6. The method of claim 1 wherein:

steps (c) and (d) of cutting serpentine paths comprise cutting along curved lines which, in each case, are bisected by the center line of the strip being cut.

7. The method of claim 1 wherein:

steps (c) and (d) of cutting serpentine paths comprise cutting along curved lines having semi-circular ends which lines, in each case, are bisected by the center line of the strip being cut.

8. The method of claim 1 wherein:

steps (c) and (d) of cutting serpentine paths comprise, in each case, passing the strip of material between cookie cutter rollers having a blade on one of the rollers defining the serpentine path.

9. Apparatus for forming a strip fastener material comprising:

(a) means for forming a first flexible strip of material having a surface of loose-weave fiber wool;

(b) means for forming a second flexible strip of material having a surface of resiliently flexible hooks adapted to releasably mate with said loose-weave fiber wool;

(c) means for cutting a serpentine path longitudinally through said first flexible strip of material to form two third strips of material having a surface of said loose-weave fiber wool and configured as a narrow strip having a plurality of identical spaced first projections extending sidewards in one direction therefrom; and, (d) means for cutting a serpentine path longitudinally through said second flexible strip of material to form two fourth strips of material having a surface of said resiliently flexible hooks adapted to releasably mate with said loose-weave fiber wool and configured as a narrow strip having a plurality of identical spaced second projections extending sidewards in one direction therefrom, said first projections and said second projections being identical in shape.

10. The apparatus of claim 9 wherein:

means for cutting said serpentine paths comprises means for passing said first and second strips of material between cookie cutter rollers having a blade on one of the rollers defining said serpentine path.

* * * * *